United States Patent
Sakai et al.

(10) Patent No.: US 10,808,759 B2
(45) Date of Patent: Oct. 20, 2020

(54) SLIDING MEMBER AND BEARING DEVICE USING THE SAME

(71) Applicant: DAIDO METAL COMPANY LTD., Nagoya, Aichi (JP)

(72) Inventors: Kazuki Sakai, Inuyama (JP); Shigeru Inami, Inuyama (JP); Kenji Nimura, Inuyama (JP)

(73) Assignee: DAIDO METAL COMPANY LTD., Nagoya-Aichi (JP)

( * ) Notice: Subject to any disclaimer, the term of this patent is extended or adjusted under 35 U.S.C. 154(b) by 0 days.

(21) Appl. No.: 16/654,954

(22) Filed: Oct. 16, 2019

(65) Prior Publication Data

US 2020/0124099 A1    Apr. 23, 2020

(30) Foreign Application Priority Data

Oct. 22, 2018 (JP) ................. 2018-198407

(51) Int. Cl.
*F16C 33/20*  (2006.01)
*F16C 33/06*  (2006.01)

(52) U.S. Cl.
CPC ............ *F16C 33/203* (2013.01); *F16C 33/06* (2013.01); *F16C 33/201* (2013.01)

(58) Field of Classification Search
CPC .... F16C 33/203; F16C 33/205; F16C 33/206; F16C 2240/54; C10N 2040/02
See application file for complete search history.

(56) References Cited

U.S. PATENT DOCUMENTS

| | | | | |
|---|---|---|---|---|
| 2014/0037236 | A1* | 2/2014 | Kobayakawa | F16C 33/22 384/397 |
| 2015/0369288 | A1* | 12/2015 | Cieslik | F16C 33/201 508/106 |
| 2016/0273583 | A1* | 9/2016 | Iwata | F16C 33/201 |
| 2016/0319867 | A1* | 11/2016 | Adam | F16C 33/201 |
| 2017/0081522 | A1* | 3/2017 | Adam | C09D 7/65 |

FOREIGN PATENT DOCUMENTS

JP    H1037962 A    2/1998

* cited by examiner

*Primary Examiner* — Phillip A Johnson
(74) *Attorney, Agent, or Firm* — Karceski IP Law, PLLC

(57) ABSTRACT

A sliding member of the present embodiment includes a bearing alloy layer and a coating layer provided on a sliding surface side thereof. The coating layer has a resin binder with sulfide particles dispersed therein. A covering portion is provided over specific particles and is made of metal oxide comprising the same metal element as a metal element constituting the sulfide particles. When measured by an X-ray photoelectron spectroscopy and an X-ray diffraction method, a ratio of a peak height of the metal oxide to a peak height of metal sulfide by the X-ray photoelectron spectroscopy is from 0.10 to 0.50, and a ratio of the peak height of the metal oxide to the peak height of the metal sulfide by the X-ray diffraction method is 0.10 or less.

3 Claims, 10 Drawing Sheets

|  | Conditions |
|---|---|
| Peripheral speed | 1.0m/s |
| Lubricant | VG10 |
| Lubrication amount | 2ml/min |
| Shaft material | FCD600-3<br>JIS G 5502:2001<br>Spherical graphite cast iron product<br>Surface roughness Rz = 0.8 μm |
| Evaluation method of coefficient of friction | Measure coefficient of starting friction after 5 hours |
| Test load | 4MPa |
| Measurement method of wear amount | Measure wear amount after 5 hours |

During the measuring of the peripheral speed,
the shaft member repeats start for 0.5 s, retention for 1.5 s,
deceleration for 0.5 s, and stop for 1.5 s.

FIG.7

Narrow Scan (Mo3d spectrum)

| Pass Energy | 20eV |
|---|---|
| Dwell Time | 0.4s |
| Energy Step | 0.1eV |
| Number of Scan | 20 |

FIG.8

| Start angle | 10° |
|---|---|
| End angle | 80° |
| Scan speed | 2°/min |
| Voltage | 32kV |
| Current | 30mA |

FIG. 9

| | Heating stop temperature T=100% | Temperature rise rate | Metal sulfide | R1 | R2 | Wear amount | Coefficient of friction after conforming |
|---|---|---|---|---|---|---|---|
| | % | °C/min | | | | ($\mu$) | |
| Example 1 | 75 | 700 | MoS2 | 0.15 | 0.03 | 1.8 | 0.080 |
| Example 2 | 80 | 700 | MoS2 | 0.22 | 0.03 | 1.5 | 0.071 |
| Example 3 | 85 | 700 | MoS2 | 0.44 | 0.07 | 1.4 | 0.076 |
| Example 4 | 80 | 900 | WS2 | 0.27 | 0.03 | 1.4 | 0.074 |
| Comparative Example 1 | No heating | – | MoS2 | 0.01 | 0.01 | 3.8 | 0.108 |
| Comparative Example 2 | 70 | 700 | MoS2 | 0.06 | 0.02 | 3.0 | 0.105 |
| Comparative Example 3 | 90 | 700 | MoS2 | 0.63 | 0.05 | 1.2 | 0.123 |
| Comparative Example 4 | 200 | 700 | MoS2 | 0.73 | 0.21 | 1.2 | 0.128 |

FIG.10

SLIDING MEMBER AND BEARING DEVICE USING THE SAME

CROSS-REFERENCE TO RELATED APPLICATIONS

This application is based on and claims priority to Japanese Patent Application No. 2018-198407, filed on Oct. 22, 2018, the entire content of which is incorporated by reference.

FIELD OF THE INVENTION

The present invention relates to a sliding member and a bearing device using this member.

BACKGROUND OF THE INVENTION

Heretofore, there has been known a sliding member provided with a coating layer including a solid lubricant on a sliding surface side of a bearing alloy layer (Japanese Patent Laid-Open No. 10-037962). In such a sliding member, a coefficient of friction is reduced by the solid lubricant made of, for example, metal sulfide, and anti-seizure property improves. In recent years, for a crankshaft of an internal combustion engine, employment of the crankshaft made of cast iron has expanded for a purpose of cost reduction. A shaft member made of the cast iron has an advantage of excellent workability, but has a disadvantage in that a fine burr-like protrusion is easily formed during processing. This protrusion damages a sliding surface of the sliding member during sliding against the sliding member that supports the shaft member, which causes abnormal wear of the sliding member. Such abnormal wear may lead to wear and tear of the coating layer in an initial stage of the sliding between the shaft member and the sliding member and it may be difficult to maintain a desired coefficient of friction.

To solve the above problem, an object of the present invention is to provide a sliding member in which wear and tear of a coating layer are decreased, a coefficient of friction is maintained, and a wear resistance improves, and a bearing device in which this sliding member is used.

SUMMARY OF THE INVENTION

To achieve the above object, according to an embodiment of the present invention, there is provided a sliding member comprising a bearing alloy layer, and a coating layer provided on a sliding surface side of the bearing alloy layer. This coating layer has a resin binder, sulfide particles and a covering portion. The sulfide particles are dispersed in the resin binder, and made of metal sulfide. The covering portion is provided over specific particles located on the sliding surface side of the coating layer among the sulfide particles dispersed in the resin binder, and is made of metal oxide comprising the same metal element as a metal element constituting the sulfide particles. Furthermore, when a surface of the coating layer on the sliding surface side is measured by an X-ray photoelectron spectroscopy and an X-ray diffraction method, a ratio of a peak height of the metal oxide to a peak height of the metal sulfide by the X-ray photoelectron spectroscopy is from 0.10 to 0.50, and a ratio of the peak height of the metal oxide to the peak height of the metal sulfide by the X-ray diffraction method is 0.10 or less.

In this way, the specific particles located on the sliding surface side among the sulfide particles included in the coating layer have the covering portion. This covering portion is made of the metal oxide comprising the same metal element as the metal element constituting the sulfide particles. Consequently, an opposite member comes in contact with the covering portion included in the coating layer in an initial conforming stage of sliding. This covering portion is made of hard metal oxide, and therefore grinds a sliding surface of the opposite member. That is, fine protrusions such as burrs that are present on the sliding surface of the opposite member are removed in contact with the hard metal oxide. Furthermore, the covering portion made of the metal oxide is removed by initial sliding against the opposite member. Therefore, the covering portion is lost, and the sulfide particles are exposed on the sliding surface. The sulfide particles slide against the smoothened opposite member from which the protrusions are removed. As a result, wear and tear of the coating layer are decreased. Additionally, when conformability with the opposite member is generated by the initial sliding, both the opposite member and the sliding member do not easily damage an opposite side of the sliding. In consequence, an oil film having a uniform thickness is formed between the opposite member and the sliding member. Therefore, a coefficient of friction can be maintained, and a wear resistance can improve.

Furthermore, it is confirmed by the X-ray photoelectron spectroscopy and the X-ray diffraction method that the covering portion made of the metal oxide is present over the specific particles located on the sliding surface side among the sulfide particles included in the coating layer. That is, the covering portion made of the metal oxide is formed in a little region of the sulfide particles included in the coating layer on the sliding surface side. Consequently, due to the initial conformability with the opposite member, the covering portion removes the protrusions of the opposite member while itself being also removed. When the initial conformability is generated, the coating layer does not damage the opposite member, and the sulfide particles made of the metal sulfide are exposed. Therefore, the coefficient of friction can be maintained, and the wear resistance can improve.

In the present embodiment, the metal element is at least one or more selected from the group consisting of Mo, W, Sn, Ti and Zr.

A bearing device of another embodiment of the present invention comprises a shaft member having a surface roughness Rz of 0.8 μm or more, and a sliding member that slides against the shaft member and supports the shaft member.

Consequently, when conformability of the shaft member with the sliding member is generated, protrusions causing wear of the sliding member are removed, and the shaft member comes in contact with sulfide particles from which a covering portion is removed. Therefore, a coefficient of friction can be maintained, and a wear resistance can improve.

BRIEF DESCRIPTION OF THE DRAWINGS

FIG. 7 is a schematic diagram showing test conditions of the sliding member according to the embodiment;

FIG. 8 is a schematic diagram showing conditions of XPS analysis of the sliding member according to the embodiment;

FIG. 9 is a schematic diagram showing conditions of XRD analysis of the sliding member according to the embodiment; and FIG. 10 is a schematic diagram showing test results of examples and comparative examples of the sliding member according to the embodiment.

DETAILED DESCRIPTION OF THE PREFERRED EMBODIMENT

Hereinafter, a sliding member according to an embodiment will be described with reference to the drawings.

Figure 1:
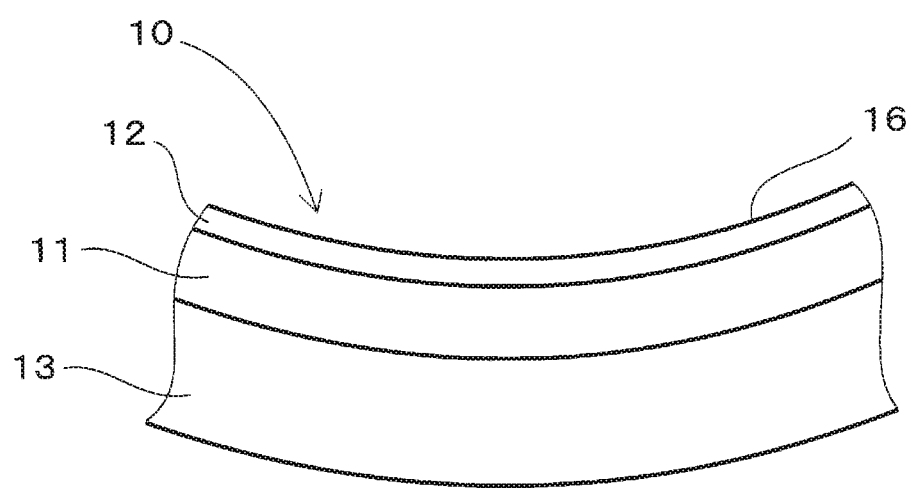
FIG. 1 is a schematic view showing a sliding member according to an embodiment.
Figure 2:
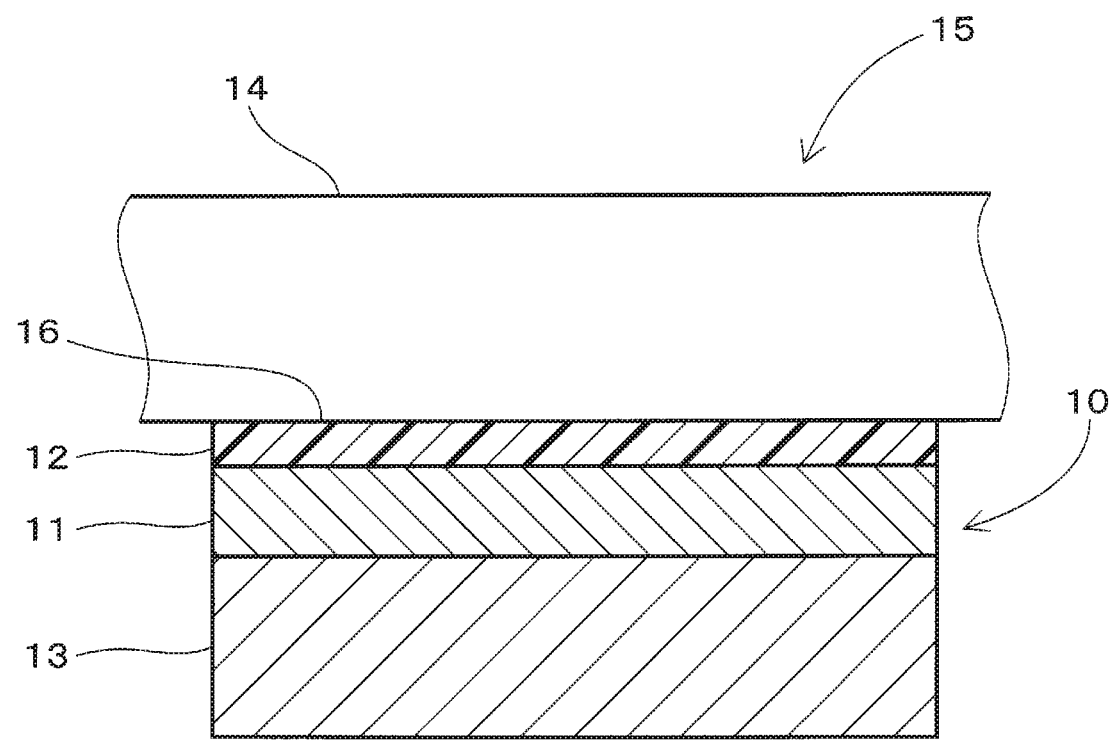
FIG. 2 is a schematic view showing a cross section of a bearing device to which the sliding member according to the embodiment is applied.

As shown in FIG. 1 and FIG. 2, a sliding member 10 according to the embodiment comprises a bearing alloy layer 11 and a coating layer 12. The sliding member 10 may be stacked on, for example, a back metal layer 13. As shown in FIG. 2, the sliding member 10 constitutes a bearing device 15 together with a shaft member 14 that is an opposite member. The sliding member 10 slides against the shaft member 14, to thereby support the shaft member 14. In the sliding member 10, a sliding surface 16 that slides against the shaft member 14 is formed on a surface of the sliding member on a coating layer 12 side. The sliding member 10 may comprise, for example, an unshown intermediate layer between the bearing alloy layer 11 and the back metal layer 13. The bearing alloy layer 11 is made of, for example, a metal such as Al or Cu, or an Al-based or Cu-based alloy. The coating layer 12 is provided on a surface of the bearing alloy layer 11. That is, the coating layer 12 is provided on the surface of the bearing alloy layer 11 on a sliding side against the shaft member 14, and has the sliding surface 16 that slides against the shaft member 14. The coating layer 12 is provided on the bearing alloy layer 11 by applying in which a general technique such as spray coating, roll coating or transfer printing is used. A thickness of the coating layer 12 can be arbitrarily set, and in the present embodiment, the thickness of the coating layer 12 is set to be from about 2 μm to 30 μm. The shaft member 14 is made of, for example, cast iron, and has a comparatively rough surface with a surface roughness Rz of 0.8 μm or more.

Figure 3:
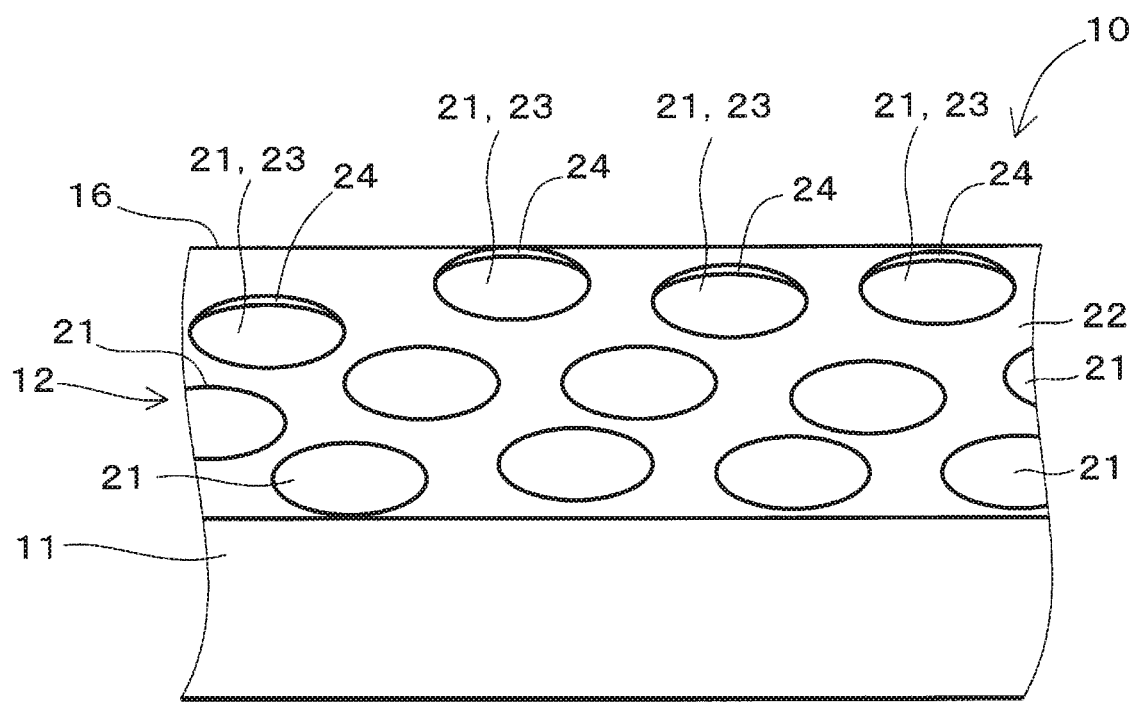
FIG. 3 is a schematic enlarged view of a main part of the sliding member according to the embodiment.

As shown in FIG. 3, the coating layer 12 of the sliding member 10 has sulfide particles 21 and a resin binder 22. The sulfide particles 21 are dispersed in the resin binder 22. The resin binder 22 is, for example, at least one or more selected from the group consisting of polyimide resin, polyamide-imide resin, epoxy resin, phenol resin, polyamide resin, fluorine resin and elastomer. Furthermore, the resin binder 22 may be a polymer alloy. The sulfide particles 21 are made of a sulfide of a metal M. The sulfide particles 21 made of the metal sulfide function as a solid lubricant that lubricates a portion between the sliding member 10 and the shaft member 14 during the sliding against the shaft member 14. The metal M constituting the sulfide particles 21 is at least one or more selected from the group consisting of Mo, W, Sn, Ti, and Zr. For example, when the metal M is Mo, the sulfide particles 21 included in the coating layer 12 are made of molybdenum sulfide ($MoS_2$).

The coating layer 12 of the sliding member 10 may contain a solid lubricant in addition to the sulfide particles 21 made of metal sulfide. The solid lubricant is, for example, at least one or more selected from the group consisting of graphite, boron nitride (h-BN), polytetrafluoroethylene (PTFE), melamine cyanate, carbon fluoride, phthalocyanine, graphene nanoplatelets, fullerene, ultrahigh molecular weight polyethylene (tradename "MIPELON" manufactured by Mitsui Chemicals, Inc.), and Nε-lauroyl-L-lysine (tradename "AMIHOPE" manufactured by Ajinomoto Co., Inc.).

The sliding member 10 comprises a covering portion 24. The covering portion 24 is provided over specific particles 23 located on a sliding surface 16 side among the sulfide particles 21 included in the coating layer 12. Specifically, as shown in FIG. 3, the sulfide particles 21 are included in a dispersed state in the resin binder 22. At this time, the sulfide particles 21 are dispersed in the resin binder 22 in a plurality of layers from a bearing alloy layer 11 side to the sliding surface 16 side of the coating layer 12. The sulfide particles 21 located in the layer on the sliding surface 16 side among these dispersed sulfide particles 21 are the specific particles 23. That is, the specific particles 23 are not limited to the sulfide particles 21 exposed from the coating layer 12 onto the sliding surface 16. For example, when the sulfide particles are buried in the coating layer 12, but the other sulfide particles 21 are not present on the sliding surface 16 side of the sulfide particles themselves, the sulfide particles 21 are then the specific particles 23. Furthermore, the specific particles 23 have the covering portion 24 on the sliding surface 16 side. The covering portion 24 is made of an oxide of the metal M. The metal M constituting the oxide that forms the covering portion 24 is the same as the metal M constituting the sulfide that forms the sulfide particles 21. That is, when the sulfide particles 21 are made of molybdenum sulfide ($MoS_2$), the covering portion 24 is made of molybdenum oxide ($MoO_3$). In this manner, the specific particles 23 located on the sliding surface 16 side have the covering portion 24 made of the oxide on the sliding surface 16 side.

Figure 4:
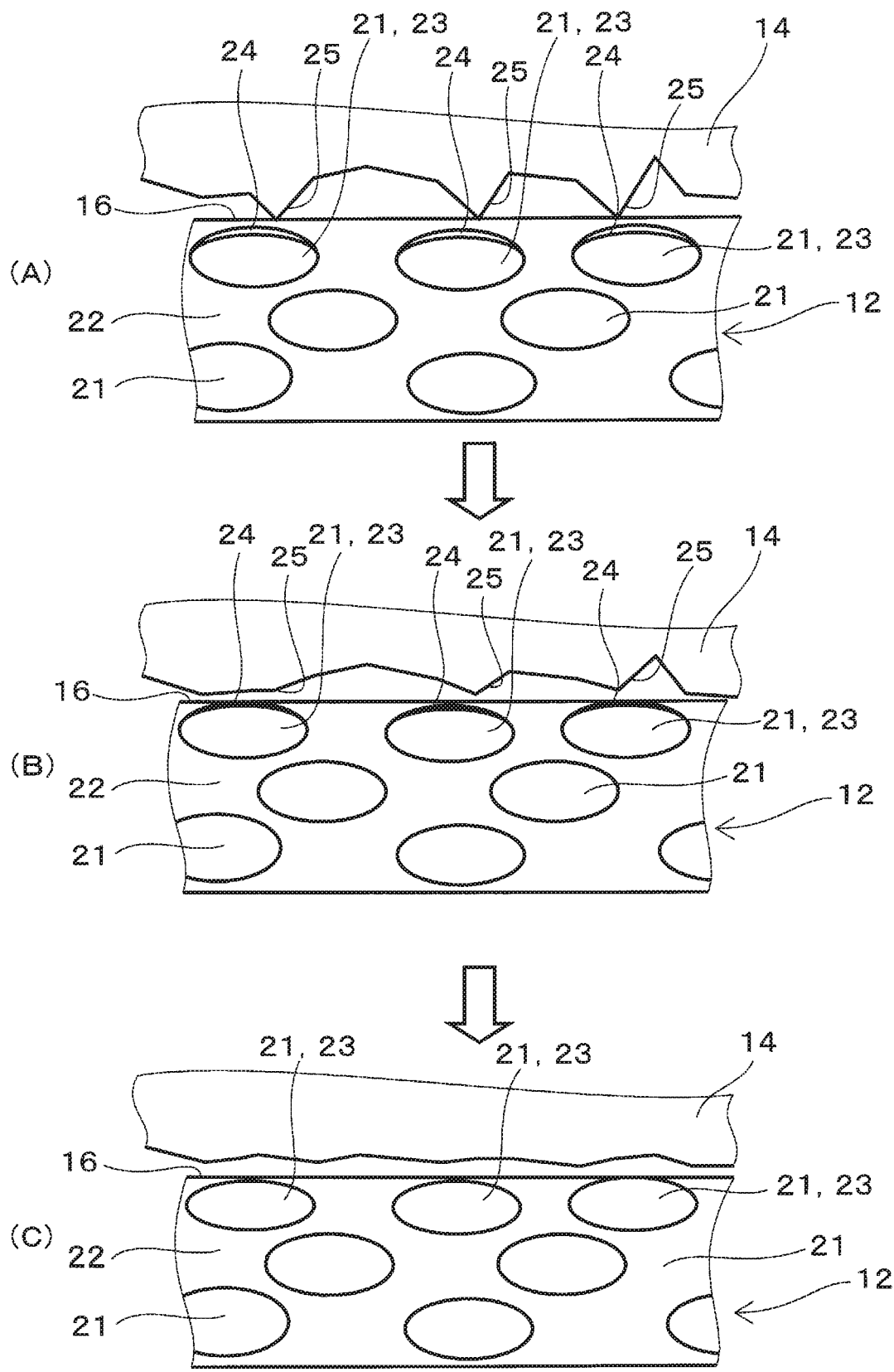
FIG. 4 is a schematic view showing a conforming process of the sliding member according to the embodiment with a shaft member.

The oxide of the metal M that forms the covering portion 24 is harder than the sulfide of the metal M that forms the sulfide particles 21. As shown in FIG. 4(A), in a conforming stage that is an initial stage of the sliding of the sliding member 10 against the shaft member 14, the shaft member 14 comes in contact with the covering portion 24 of the specific particles 23 included in the coating layer 12. The covering portion 24 is a hard metal oxide as described above. Therefore, for example, when attacking fine protrusions 25 such as burrs are generated in the shaft member 14, as shown in FIG. 4(B) and FIG. 4(C), these fine protrusions 25 are ground by the covering portion 24 during the sliding of the sliding member 10 against the shaft member 14. On the other hand, the covering portion 24 itself is also worn during the grinding of the protrusions 25 in the conforming stage. Therefore, when the conforming stage is completed as shown in FIG. 4(C), the covering portion 24 is removed, and the shaft member 14 comes in contact with the sulfide particles 21 included in the coating layer 12. Consequently, the shaft member 14 comes in contact with the metal sulfide constituting the sulfide particles 21, and is not attacked by the hard covering portion 24. Consequently, in the conforming stage with the shaft member 14, the covering portion 24 removes the fine protrusions 25 formed in the shaft member 14, and the covering portion itself is also removed. As a result, after the conforming stage of the sliding member 10 against the shaft member 14, lubrication is achieved by the sulfide particles 21 included in the coating layer 12. Furthermore, attacks from the sliding member 10 to the shaft member 14 and attacks from the shaft member 14 to the sliding member 10 are reduced, and a low coefficient of friction and a high wear resistance are maintained.

Next, description will be made as to specifying of the sulfide particles 21 and the covering portion 24 in the coating layer 12 according to the above configuration.

In the embodiment, an end surface of the coating layer 12, that is, the sliding surface 16 is measured by an X-ray photoelectron spectroscopy and an X-ray diffraction method. The X-ray photoelectron spectroscopy (XPS) is a type of surface analysis method also referred to as an electron spectroscopy for chemical analysis (ESCA). In the XPS, when a surface of a solid sample is irradiated with a soft X-ray under an ultrahigh vacuum, electrons bound to the surface of the sample are emitted into the vacuum due to a photoelectric effect. At this time, the X-ray with which the sample is irradiated is an MgKα ray or an AlKα ray. The electrons emitted due to the photoelectric effect are photoelectrons. Binding energy in the emission of the photoelectrons is energy inherent in an element. Consequently, the element can be qualitatively analyzed based on the binding energy. On the other hand, a mean free path along which the photoelectrons can travel without any obstruction such as scattering or collision has a distance of about several nanometers. Consequently, an XPS detector cannot detect the photoelectrons that are present at deep positions of several nanometers or more from the surface of the sample. In the present embodiment, the element is analyzed in a very shallow range, i.e., a range of several nanometers from the surface of the sample by use of such characteristics of the XPS.

On the other hand, in the X-ray diffraction method (XRD), when the sample is irradiated with the X-ray, there is analyzed diffraction that occurs as a result of scattering or interference by the X-ray with electrons around an atom. When this diffraction is analyzed, it is possible to identify and quantify components of the sample. A transmission capacity, that is, a penetration depth to a substance of the X-ray varies with a composition of the sample or a wavelength of the X-ray, but is generally from 50 μm to 100 μm. Consequently, in the XRD, the analysis is possible in a region deeper than that of the above XPS. In the present embodiment, the element is analyzed in the range of 50 μm to 100 μm from the surface of the sample by use of such characteristics of the XRD, the range being deeper than that of the XPS.

In the sliding member 10 of the present embodiment, when the sliding surface 16 that is the end surface of the coating layer 12 is measured by using such XPS and XRD as described above, the following conditions are satisfied:

(1) as a result of the analysis by the XPS, a ratio R1 of a peak height of the metal oxide to a peak height of the metal sulfide is from 0.10 to 0.50; and (2) as a result of the analysis by the XRD, a ratio R2 of the peak height of the metal oxide to the peak height of the metal sulfide is 0.10 or less.

In each of the XPS and the XRD, the sliding surface 16 that is the end surface of the coating layer 12 in the sliding member 10 is analyzed. That is, the analysis is executed from the sliding surface 16 side of the sliding member 10 in each of the XPS and the XRD. Consequently, in the XPS, a region that is very close to an outermost surface in a range of several nanometers from the end surface of the sliding member 10 is analyzed. Furthermore, in the XRD, a range of 50 μm to 100 μm from the end surface of the sliding member 10 is analyzed. At this time, in the XRD, the analysis is not limited to the coating layer 12 depending on thicknesses of the coating layer 12 and the bearing alloy layer 11, and the bearing alloy layer 11 or the back metal layer 13 may be also analyzed. In this case, an absolute value of a strength of the metal sulfide or the metal oxide to be measured decreases. However, even when the absolute value of the strength decreases, the ratio R2 to be calculated is not influenced.

Figure 5:
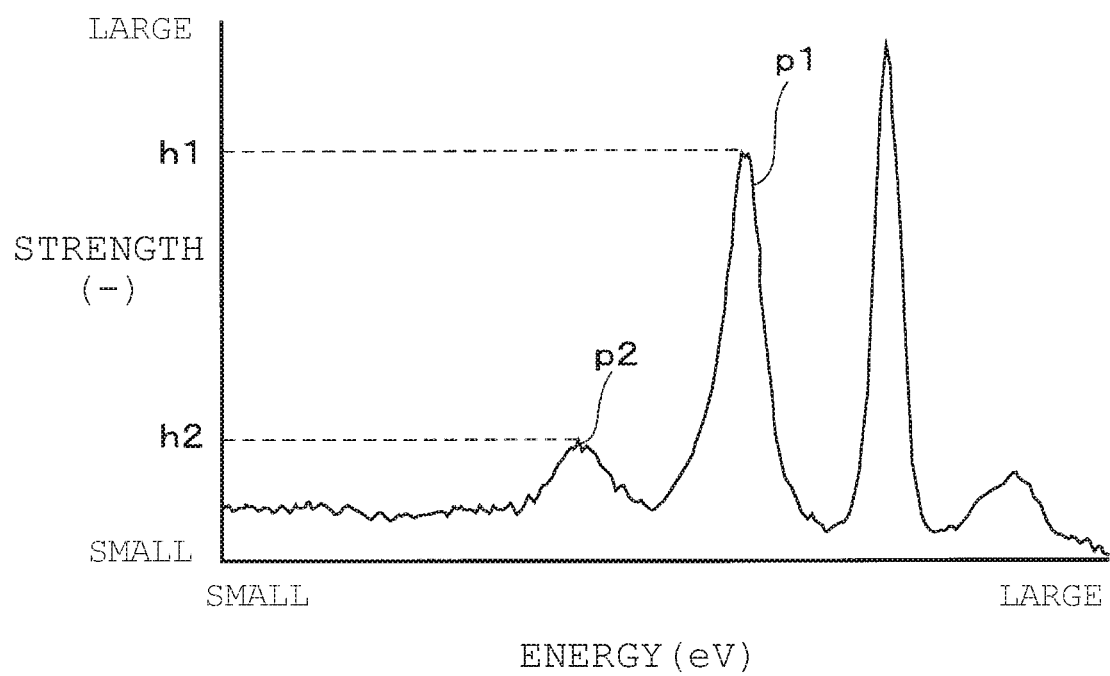
FIG. 5 is a schematic diagram showing an example of an XPS analysis result of the sliding member according to the embodiment.

As shown in FIG. 5, a relation between the binding energy and the strength is obtained in the analysis by the XPS. At this time, the metal sulfide and the metal oxide are different from each other in binding energy, and hence a peak of the strength varies. FIG. 5 shows $MoS_2$ as an example of the metal sulfide and $MoO_3$ as an example of the metal oxide. As each of the peaks of the metal sulfide and the metal oxide, a largest main peak or a next large sub main peak is used. For example, when the peaks of the metal sulfide and the metal oxide are superimposed on each other and it is difficult to separate the peaks, the peak is not limited to the main peak, and the next large sub main peak is used. When the main peak is selected, the main peak is used for both of the metal sulfide and the metal oxide. On the other hand, when the sub main peak is selected, the sub main peak is used for both of the metal sulfide and the metal oxide. In the present embodiment shown in FIG. 5, it is difficult to separate the main peak of the metal oxide $MoO_3$, and hence the sub main peak is used for both of the metal sulfide and the metal oxide. That is, in the present embodiment, there are used a sub main peak p1 of the metal sulfide and a sub main peak p2 of the metal oxide shown in FIG. 5. Thus, a ratio R1 between an obtained peak height h1 of the strength of the metal sulfide and an obtained peak height h2 of the strength of the metal oxide is calculated as R1=h2/h1. The strength peak is measured several times, and obtained results are averaged to calculate the ratio R1. In the present embodiment, the ratio R1 is in a range of 0.10 to 0.50. This indicates that a presence frequency of the metal oxide constituting the covering portion 24 is high in a range of several nanometers from the outermost surface of the coating layer 12 on the sliding surface 16 side.

Figure 6:
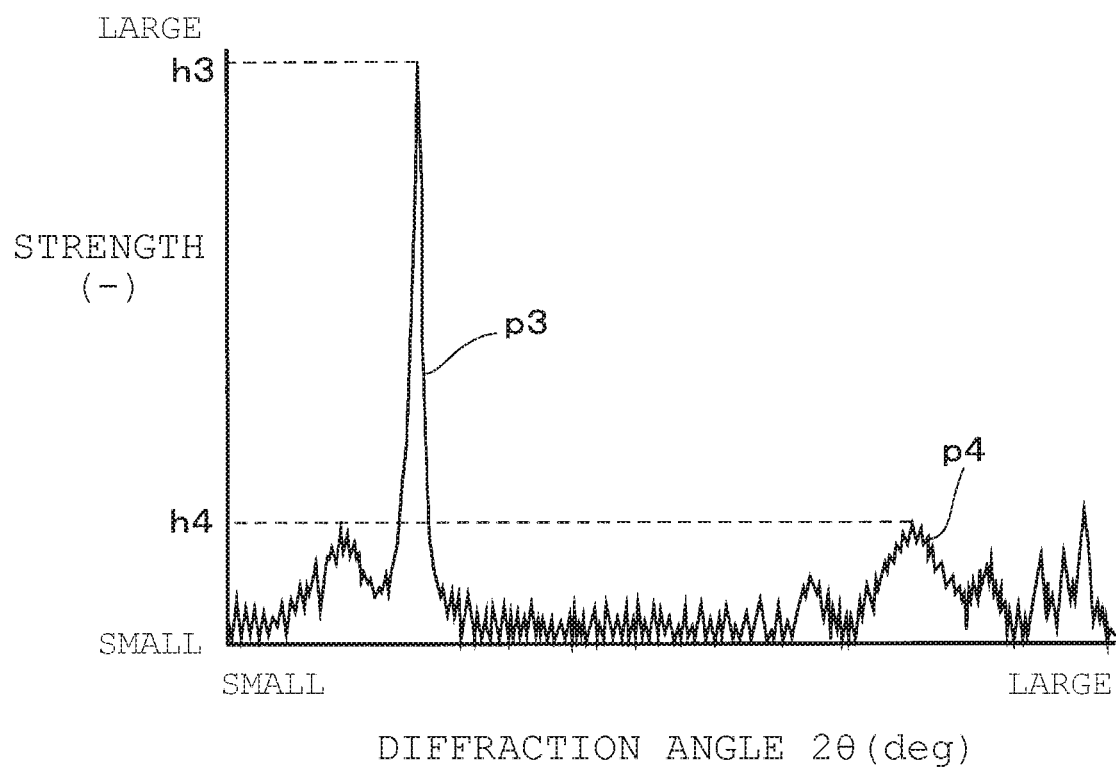
FIG. 6 is a schematic diagram showing an example of an XRD analysis result of the sliding member according to the embodiment.

In the analysis by the XRD, such a diffraction pattern as shown in FIG. 6 is obtained. At this time, the metal sulfide and the metal oxide are different from each other in diffraction pattern. FIG. 6 shows $MoS_2$ as an example of the metal sulfide and $MoO_3$ as an example of the metal oxide. As each of the peaks of the metal sulfide and the metal oxide, an angle corresponding to the largest strength is used according to an analysis result of the XRD. That is, in the present embodiment, a peak p3 of the metal sulfide and a peak p4 of the metal oxide are used as shown in FIG. 6. Thus, a value R2 of a ratio between an obtained peak height h3 of the strength of the metal sulfide and an obtained peak height h4 of the strength of the metal oxide is calculated as R2=h4/h3. In the present embodiment, this ratio value R2 is 0.10 or less. This indicates that the presence frequency of the metal oxide constituting the covering portion 24 is low in a range of 50 μm to 100 μm from the outermost surface of the coating layer 12 on the sliding surface 16 side.

As seen from these results, in the sliding member 10 of the present embodiment that satisfies the conditions of the ratio R1 and the conditions of the ratio R2, the covering portion 24 made of the metal oxide predominates in the specific particles 23 located close to the sliding surface 16 among the sulfide particles 21 included in the coating layer 12, while the metal sulfide constituting the sulfide particles 21 predominates in a region deeper than the above location. That is, it is indicated that in the sliding member 10 of the present embodiment that satisfies the above conditions, the covering portion 24 made of the metal oxide is formed in the specific particles 23 located close to the sliding surface 16 among the sulfide particles 21 made of the metal sulfide.

Next, a manufacturing method of the sliding member 10 of the present embodiment according to the above configuration will be described.

In the sliding member 10, as shown in FIG. 3, the coating layer 12 is provided on the surface of the bearing alloy layer 11, that is, on the sliding surface 16 side. The bearing alloy layer 11 on the sliding surface 16 side is degreased in a pretreatment process. The surface of the degreased bearing alloy layer 11 is roughened by using, for example, sand blasting, machining or a surface treatment. Thus, dirt is removed by the surface roughening. Afterward, a coating material constituting the coating layer 12 is applied to the surface of the bearing alloy layer 11. This coating material includes the sulfide particles 21 made of the metal sulfide. The applied coating material forms the coating layer 12, for example, through drying, firing or the like. When a heat treatment is performed on the sliding member 10 on which the coating layer 12 is formed, an oxide constituting the covering portion 24 is generated in the specific particles 23 included in the coating layer 12. That is, surfaces of the specific particles 23 are oxidized by the heat treatment, and a part of the metal sulfide constituting the specific particles 23 is oxidized into the metal oxide. In this case, for the heat treatment, for example, heating with an infrared heater, heating with electron beams, or heating in a drying furnace can be used. Particularly, in the present embodiment, the heating with the infrared heater is preferably used. When the heating in the drying furnace or another general heating is used, much time is required in raising a temperature. Furthermore, a temperature of a base such as the bearing alloy layer 11 also rises. Therefore, the sulfide particles 21 included in the coating layer 12 are heated not only on a side close to the sliding surface 16 but also at positions that are far and deep from the sliding surface 16. As a result, the sulfide particles 21 in the whole coating layer 12 are heated, and the oxidation of the metal sulfide constituting the sulfide particles 21 also easily proceeds. On the other hand, when the heating with the infrared heater is used, the sulfide particles 21 included in the coating layer 12 in a range very close to the sliding surface 16 are momentarily heated. Consequently, when heated with the infrared heater, the specific particles 23 located at positions close to the sliding surface 16 only on the sliding surface 16 side are oxidized among the sulfide particles 21 included in the coating layer 12 as in the present embodiment, thereby forming the covering portion 24.

Hereinafter, examples and comparative examples of the present embodiment will be described.

In Example 1 to Example 4 and Comparative Example 2 to Comparative Example 4, a coating layer 12 was formed in each sample, and the sample was then heated with an infrared heater. In Comparative Example 1, a coating layer 12 was not heated. In the heating with the infrared heater, a temperature is raised at a constant temperature rise rate. That is, when an oxidation promotion temperature at which oxidation of metal sulfide is promoted is T (° C.), the temperature rise rate is set to T×2 (° C./min.). Subsequently, when a surface temperature of the sample reached a predetermined range of the oxidation promotion temperature T of the metal sulfide, the heating of the sample stopped. In this case, the predetermined range was set to a range of 75% to 85% of the oxidation promotion temperature T. Specifically, when the surface temperature of the sample reached the range of 75% to 85% of the oxidation promotion temperature T, the heating of the sample stopped. The surface temperature of the sample was measured by using a contact thermometer, and directly detected with a sensor. Here, the oxidation promotion temperature T of the sample is a temperature at which, when powder of metal sulfide constituting a solid lubricant is heated in atmosphere for 72 hours and is gradually cooled, 30 wt % of the whole powder becomes an oxide. In the present embodiment, a weight ratio of this oxide was measured by using a carbon sulfur analysis device (EMIA-810 manufactured by HORIBA, Ltd.).

As for data prepared as described above, a ratio R1 by an XPS and a ratio R2 by an XRD were calculated, and a test was conducted by using test conditions shown in FIG. 7, to measure a wear amount of the coating layer 12 and a coefficient of friction after conforming. The XPS was performed by using AXIS ULTRA manufactured by Kratos Co. A spot size of an X-ray was set to 1 mm, and a neutralizing gun was set to be on. Measurement conditions of the XPS were set as shown in FIG. 8. The XRD was performed by using RINT2200 manufactured by Rigaku Corporation. Measurement conditions of the XRD were set as shown in FIG. 9.

In Example 1 to Example 4, as shown in FIG. 10, a temperature to stop heating, a temperature rise rate and metal elements were set. In Example 1 to Example 4, a wear amount and a coefficient of friction after conforming indicated satisfactory results irrespective of the set conditions. In Example 1 to Example 4, the coefficient of friction increased in a conforming stage, but then decreased. Then, in Example 1 to Example 4, after the conforming stage was completed, lubrication was performed with a solid lubricant included in the coating layer 12. Therefore, the coefficient of friction indicated a small value over a long period of time.

On the other hand, Comparative Example 1 and Comparative Example 2 indicated a result that a wear amount was large and a coefficient of friction after conforming was high. In Comparative Example 1, a deposited coating layer 12 was not heated. Consequently, in Comparative Example 1, a covering portion 24 made of metal oxide was not formed. Furthermore, in Comparative Example 2, a temperature to stop heating was set to 70% of an oxidation promotion temperature T. Therefore, it is considered that in Comparative Example 2, the temperature does not sufficiently rise during heating, metal sulfide is not sufficiently oxidized, and a covering portion 24 was not sufficiently formed. In consequence, it is considered that in Comparative Example 1 and Comparative Example 2, the coating layer 12 is worn and torn by attacks from a shaft member 14 after a conforming stage. It is eventually considered that in Comparative Example 1 and Comparative Example 2, the coefficient of friction gradually increases after the conforming stage.

Furthermore, Comparative Example 3 and Comparative Example 4 indicated a result that a wear amount of a coating layer 12 was satisfactory, and a coefficient of friction after conforming was high. Comparative Example 3 is an example where a temperature to stop heating is set to 90% of an oxidation promotion temperature T, and Comparative Example 4 is an example where the temperature to stop the heating is set to 200% of the oxidation promotion temperature T. Comparative Example 3 and Comparative Example 4 indicates that a temperature excessively rose during the heating, and a large part of sulfide particles 21 included in a coating layer 12 was oxidized into metal oxide constituting a covering portion 24. It is considered that when the metal oxide constituting the covering portion 24 is excessively generated, hardness of a solid lubricant included in the coating layer 12 increases, and a lubricating action of the metal sulfide deteriorates. Consequently, in Comparative Example 3 and Comparative Example 4, the coating layer 12 ground a shaft member 14 in a conforming stage, and then, also had high attack property to the shaft member 14. As a result, it is considered that the coefficient of friction is not easily reduced in Comparative Example 3 and Comparative Example 4.

It is clear from results shown in FIG. 10 that an example of the sliding member 10 satisfying the conditions of the present embodiment contributes to decrease of wear and reduction of a coefficient of friction after conforming.

The present invention described above is not limited to the above embodiment, and various embodiments can be applied without departing from gist of the invention.

What is claimed is:

1. A sliding member comprising:
a bearing alloy layer, and
a coating layer provided on a sliding surface side of the bearing alloy layer,
wherein the coating layer has:
a resin binder,
sulfide particles dispersed in the resin binder, and made of metal sulfide, and
a covering portion provided over specific particles located on the sliding surface side of the coating layer among the sulfide particles dispersed in the resin binder, the covering portion being made of metal oxide comprising the same metal element as a metal element constituting the sulfide particles, and
when a surface of the coating layer on the sliding surface side is measured by an X-ray photoelectron spectroscopy and an X-ray diffraction method,
a ratio of a peak height of the metal oxide to a peak height of the metal sulfide by the X-ray photoelectron spectroscopy is from 0.10 to 0.50, and
a ratio of the peak height of the metal oxide to the peak height of the metal sulfide by the X-ray diffraction method is 0.10 or less.

2. The sliding member according to claim 1, wherein the metal element is at least one or more selected from the group consisting of Mo, W, Sn, Ti and Zr.

3. A bearing device comprising:
a shaft member having a surface roughness Rz of 0.8 μm or more, and
a sliding member according to claim 1 that slides against the shaft member, and supports the shaft member.

* * * * *